G. E. MOLYNEUX.
TRANSMISSION FOR POWER TABLE SEWING MACHINES, &c.
APPLICATION FILED MAR. 1, 1918.
1,324,129.  Patented Dec. 9, 1919.
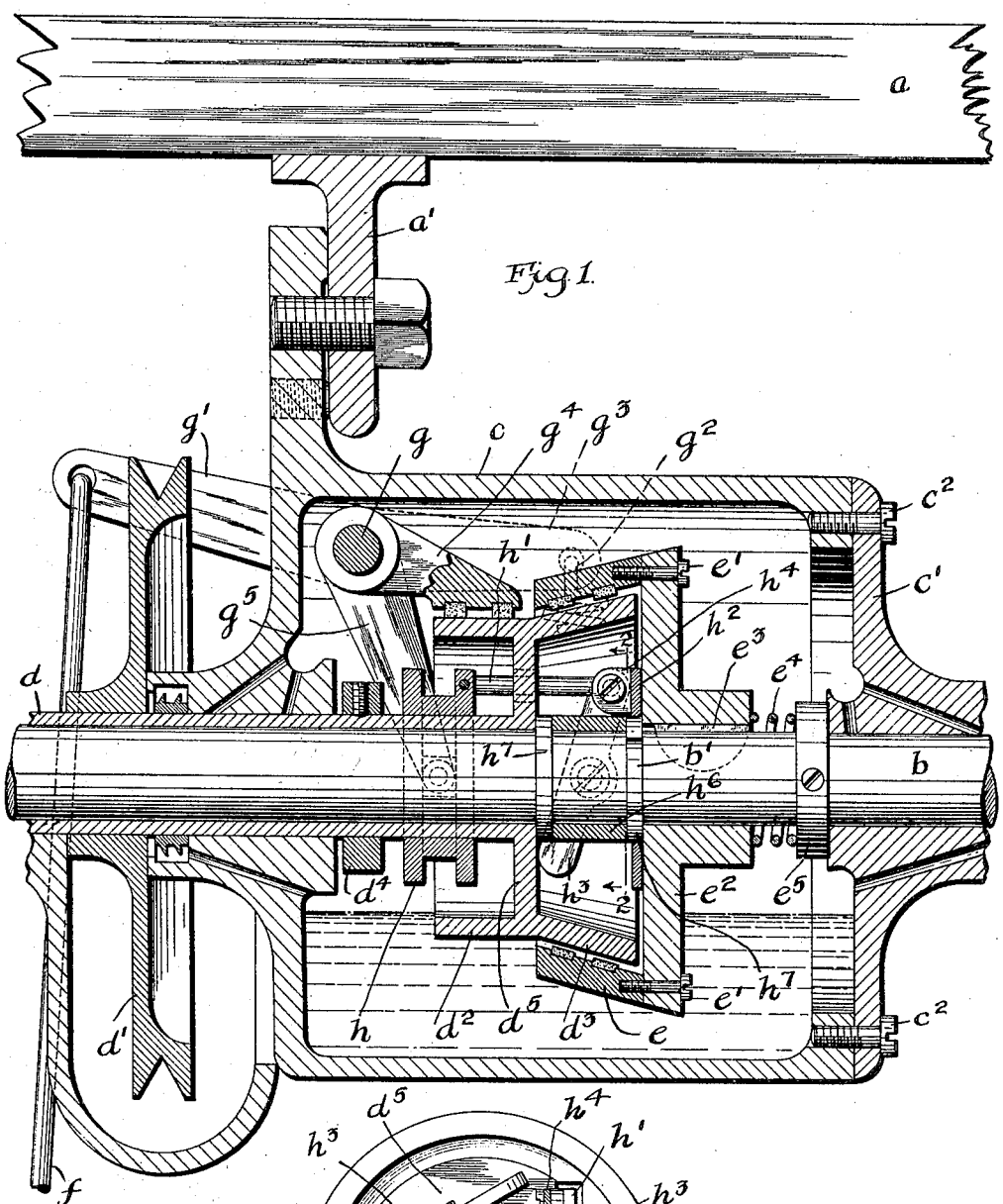
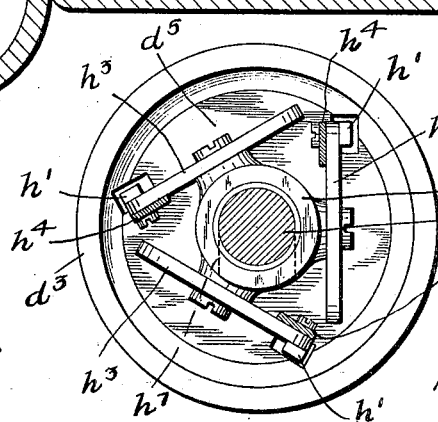

UNITED STATES PATENT OFFICE.

GEORGE E. MOLYNEUX, OF BAYONNE, NEW JERSEY.

TRANSMISSION FOR POWER-TABLE SEWING-MACHINES, &c.

1,324,129.　　　　　Specification of Letters Patent.　　Patented Dec. 9, 1919.

Application filed March 1, 1918. Serial No. 219,785.

*To all whom it may concern:*

Be it known that I, GEORGE E. MOLYNEUX, a citizen of the United States, residing in Bayonne, in the State of New Jersey, have invented certain new and useful Improvements in Transmissions for Power - Table Sewing-Machines, &c., of which the following is a specification, reference being had to the accompanying drawing, forming a part hereof.

This invention relates particularly to power transmission devices such as those which are employed to drive the several sewing machines of a power-table from a common driving shaft and permit each sewing machine, at the will of its operator, to be operatively connected with or disconnected from the driving shaft, a brake usually being applied to the transmission device simultaneously with the disconnection from the driving shaft. The particular object in view in the development of the invention has been to construct the clutch mechanism employed in such manner as to eliminate end thrust on the driving shaft while retaining the advantages of a friction clutch and making the transmission simple, compact, self-contained and self-lubricating. The invention will be described more fully hereinafter with reference to the accompanying drawing in which it is illustrated, and in which—

Figure 1 is a view of the improved transmission in longitudinal section, a portion of a power-table being also shown.

Fig. 2 is a detail view in section on the plane indicated by the line 2—2 of Fig. 1, looking in the direction of the arrows.

A power-table, on which may be mounted the several sewing machines to be driven through the improved transmission devices from the common driving shaft, is indicated at $a$. Supported in suitable bearings below the table $a$ is the driving shaft $b$, which may be either sectional or continuous. To a bracket $a'$, on the underside of the power-table, is suitably secured a casing $c$ which supports and incloses the transmission mechanism hereinbefore referred to. The open end of the casing is closed by a removable cap $c'$ which may be secured by screws $c^2$. The shaft $b$ may have a bearing directly in the cap $c'$, but at the other end of the casing it has a bearing in a sleeve $d$ which receives, outside of the casing, a pulley $d'$, by which the sewing machine is driven.

The sleeve $d$ receives or has formed therewith a cylindrical brake drum $d^2$ and a conical clutch member $d^3$, the clutch member flaring outwardly as shown. A collar $d^4$ may be secured to the sleeve $d$ to prevent or to limit movement thereof to the left. A female clutch member $e$, internally tapered to coöperate with the male clutch member $d^3$, is secured by screws $e'$, so as to permit the assembling of the parts, to a clutch carrier $e^2$ which is mounted on the shaft $b$ and is held to rotate therewith, while free to move longitudinally thereon, by a spline $e^3$. The clutch carrier $e^2$ is thrust normally to the left, so that the clutch member $e$ shall clear the clutch member $d^3$, by a spring $e^4$ which abuts against a collar $e^5$ secured to the shaft.

The controlling pedal by which the operator controls the transmission, is connected, as usual, by a link $f$ to an arm $g'$ of a rock shaft $g$, the pedal acting against a spring $g^2$ which is connected to another arm $g^3$ of the rock shaft. A brake arm $g^4$ is also carried by the rock shaft $g$ and is arranged to coöperate with the brake drum $d^2$. A clutch arm $g^5$, also carried by the shaft $g$, engages a circumferentially grooved collar $h$, which is mounted to slide on the sleeve $d$ and is connected by rods $h'$ with a thrust ring $h^2$ which bears against the inner face of the clutch carrier $e^2$. Thrust levers $h^3$ are pivotally connected at one end with the thrust ring $h^2$ through ears $h^4$ on the latter and bear at the other end against the face of a disk $d^5$ which supports the brake drum $d^2$ and the clutch member $d^3$. These thrust levers $h^3$ are pivotally mounted on a spider $h^6$ which is mounted loosely on the shaft $b$ and may be held from longitudinal movement thereon by spring rings $h^7$ which are snapped into circumferential grooves $b'$ on the shaft $b$.

Normally the parts are in the positions shown in Fig. 1, with the clutch carrier $e^2$ pressed to the left by the spring $e^4$ so that the clutch member $e$ clears the clutch member $d^3$, and with the brake arm $g^4$ resting upon the brake drum $d^2$, whereby the sleeve $d$ is freed from the shaft $b$ and is held stationary by the brake. Pressure of the foot of the operator upon the pedal connected with the link $f$ causes the shaft $g$ to be rocked in an anti-clockwise direction, whereby, through the arm $g^5$, circumferentially grooved ring $h$, rods $h'$ and thrust ring $h^2$, the clutch carrier $e$ is moved to the right, against the pressure of the spring $e^4$, and the clutch member $e$ is brought into driving engagement with the clutch member $d^3$. At the same time the brake $g^4$ is moved away from the brake drum $d^2$. The sleeve $d$ is then driven with the shaft $b$ and, through the pulley $d'$, the sewing machine is driven. As soon as the pressure of the operator's foot on the pedal is relieved the pressure of the spring $g^2$ causes the shaft $g$ to be rocked in a direction to apply the brake $g^4$ to the drum $d^2$ and to permit the clutch member $e$ to be moved by the spring $e^4$ in a direction to clear the clutch member $d^3$, whereby the sleeve $d$ ceases to rotate and the sewing machine, driven by the pulley $d'$ ceases to operate. It will be observed that the slight pressure necessary to open the clutch is exerted directly by the spring $e^4$ against the sliding clutch carrier $e^2$, the brake being applied to the brake drum at the same time by the pressure of the spring $g^2$. When, however, the sleeve $d$ is to be coupled with the shaft $b$, so as to be driven thereby, the pressure of the operator's foot, through the pedal, the link $f$, the arm $g'$, the shaft $g$ and the arm $g^5$, is exerted directly, through the longitudinally movable grooved ring $h$, the rods $h'$ and the thrust ring $h^2$, against the inner face of the clutch carrier $e^2$, the pressure against the ring $h^2$ being caused to react, through the pressure levers $h^3$, against the proximate face of the disk $d^5$ which carries the brake drum and the male clutch member. There is, therefore, when the clutch is being engaged and while it is held engaged, no end thrust on the shaft $b$ which tends to move the same longitudinally.

It will be understood that various changes in details of construction and arrangement may be made to suit different conditions of use without departing from the spirit of the invention so far as the same is set forth in the accompanying claims.

I claim as my invention:

1. In a transmission for a power-table and the like, the combination of a driving shaft, two coöperating clutch members, both of which are supported directly on the driving shaft, one of said clutch members being rotatable with the driving shaft, one of said clutch members being movable longitudinally on the driving shaft and one of said clutch members being rotatable independently of the driving shaft and held from longitudinal movement thereon, means to move the longitudinally movable member on the driving shaft in one direction, controllable means to move the movable clutch member in the opposite direction, and means whereby the thrust of such controllable means against the movable member in one direction is transmitted to the longitudinally immovable member in the opposite direction and the driving shaft is relieved of end thrust pressure.

2. In a transmission for a power-table and the like, the combination of a driving shaft, two coöperating conical clutch members both of which are supported directly on the driving shaft, one of said clutch members being rotatable with the driving shaft, one of said clutch members being movable longitudinally on the driving shaft, and one of said clutch members being rotatable independently of the driving shaft and held from longitudinal movement thereon, means to move the longitudinally movable member on the driving shaft in the direction to disengage the clutch members, controllable means to move the movable member in the opposite direction and means whereby the thrust of such controllable means against the movable member is transmitted to the longitudinally immovable member in the opposite direction and the driving shaft is relieved of end thrust pressure.

3. In a transmission for a power-table and the like, the combination of a driving shaft, an outwardly flaring conical male clutch member, an inwardly conical female clutch member to coöperate therewith, one of said clutch members being rotatable with the driving shaft, one of said clutch members being movable longitudinally on the driving shaft, and one of said clutch members being rotatable independently of the driving shaft, means to move the longitudinally movable member on the driving shaft in one direction, controllable means to move the movable member in the opposite direction and means whereby the thrust of such controllable means against the movable member is transmitted to the other member in the opposite direction and the driving shaft is relieved of end thrust pressure.

4. In a transmission for a power-table and the like, the combination of a driving shaft, an outwardly flaring conical male clutch member, an inwardly conical female clutch member to coöperate therewith, said inwardly conical female clutch member being rotatable with the driving shaft and movable longitudinally thereon, and said male clutch member being rotatable independently of the driving shaft, means to move the female clutch member longitudinally to disengage it from the male clutch member, controllable means to move the female clutch member in the opposite direction and means whereby the thrust of such controllable means against the female member in one direction is transmitted to the male clutch member in the opposite direction and the driving shaft is relieved of end thrust pressure.

5. In a transmission for a power-table and the like, the combination of a driving shaft, coöperating clutch members mounted on the driving shaft, one of said clutch members being rotatable with the driving shaft, one of said clutch members being movable longitudinally on the driving shaft and one of said clutch members being rotatable independently of the driving shaft, means to move the longitudinally movable clutch member on the driving shaft in one direction, means to move the movable clutch member in the opposite direction, a thrust lever connected at one end with said last named means and bearing at the other end against the other clutch member, and means mounted loosely on the shaft to support said thrust lever.

6. In a transmission for a power-table and the like, the combination of a driving shaft, coöperating clutch members mounted on the driving shaft, one of said clutch members being rotatable with the driving shaft, one of said clutch members being movable longitudinally on the driving shaft and one of said clutch members being rotatable independently of the driving shaft, means to move the longitudinally movable clutch member on the driving shaft in one direction, means to move the movable clutch member in the opposite direction, a thrust lever connected at one end with said last named means and bearing at the other end against the other clutch member, and a sleeve mounted loosely on the driving shaft and held from longitudinal movement thereon, the thrust lever being pivotally mounted on said sleeve.

7. In a transmission for a power-table and the like, the combination of a driving shaft, a sleeve mounted loosely on the driving shaft and carrying a clutch member, a second clutch member to coöperate with the first and mounted to rotate with and slide on the shaft, means to move said last named clutch member in one direction, a circumferentially grooved ring mounted loosely on the sleeve, a thrust rod connected at one end with said ring and acting at the other end against the movable clutch member, a thrust lever operatively connected at one end with the thrust rod and bearing at the other end against the other clutch member, and a sleeve mounted loosely on the shaft and supporting pivotally the thrust member.

This specification signed this 27th day of February, A. D. 1918.

GEORGE E. MOLYNEUX.